Figure 1:
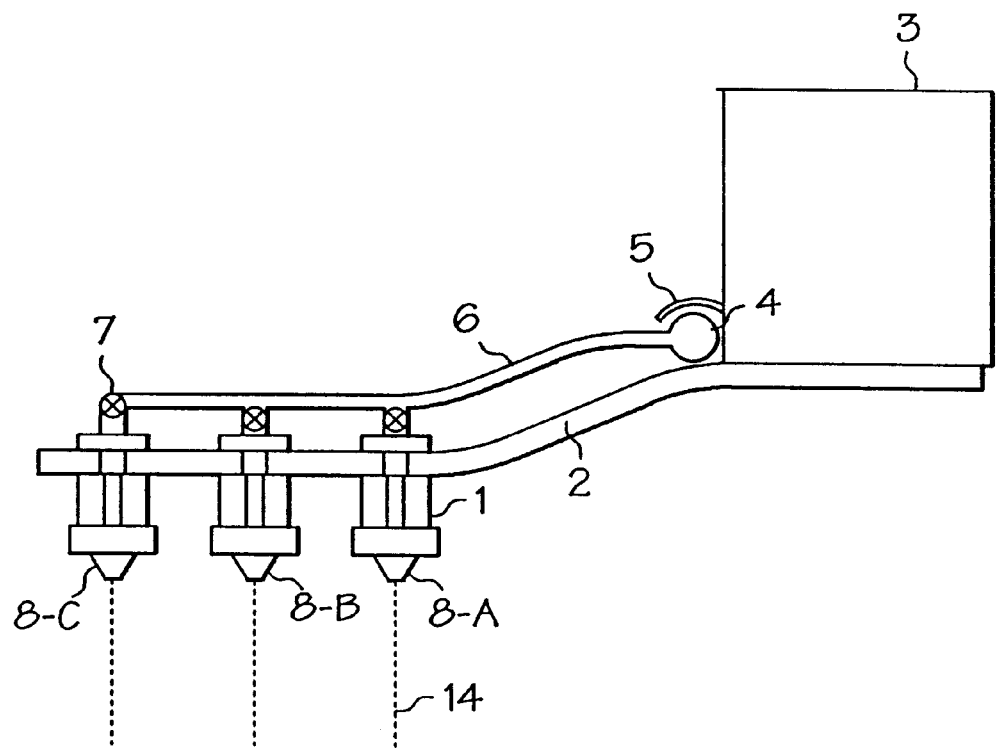

United States Patent
Wilger et al.

[11] Patent Number: 6,126,088
[45] Date of Patent: Oct. 3, 2000

[54] EXTENDED RATE RANGE SPRAYER NOZZLE SYSTEM

[76] Inventors: Wilfred H. Wilger, 219 Ball Crescent, Saskatoon, Saskatchewan, Canada, S7K 6E1; Mark Bartel, 120 Lakewood Dr., Lexington, Tenn. 38351

[21] Appl. No.: 09/128,847

[22] Filed: Aug. 4, 1998

[51] Int. Cl.[7] ........................... B05B 1/16
[52] U.S. Cl. .................. 239/170; 239/68; 239/159; 239/67; 239/161; 239/436; 239/444; 239/551; 239/562; 239/569; 239/723; 239/726
[58] Field of Search ............... 239/67, 68, 159, 239/161, 162, 163, 170, 436, 443, 444, 548, 550, 551, 562, 556, 566, 557, 569, 578, 722, 723, 726

[56] References Cited

U.S. PATENT DOCUMENTS

| | | | |
|---|---|---|---|
| 2,086,055 | 7/1937 | Taylor | 239/163 X |
| 3,782,634 | 1/1974 | Herman | 239/163 X |
| 3,853,272 | 12/1974 | Decker et al. | 239/551 X |
| 3,987,964 | 10/1976 | Pittman et al. | 239/550 X |
| 4,518,118 | 5/1985 | Takata | 239/163 |
| 4,735,365 | 4/1988 | Smeller et al. | 239/163 X |
| 4,878,598 | 11/1989 | Ruschhaupt, Jr. | 239/159 X |
| 5,184,775 | 2/1993 | Kerber | 239/163 |
| 5,433,380 | 7/1995 | Hahn | 239/159 X |
| 5,772,114 | 6/1998 | Hunter | 239/170 X |
| 6,015,097 | 1/2000 | VanPutten | 239/170 X |

Primary Examiner—Andres Kashnikow
Assistant Examiner—Robin O. Evans
Attorney, Agent, or Firm—Craig J. Lervick; Oppenheimer Wolff & Donnelly LLP

[57] ABSTRACT

A nozzle mounting and control system for use in sprayers comprising multiple sets of nozzles mounted in the operating position on a sprayer boom. Control valves are operable to select which sets of nozzles are operating at any given time. The valves may be remote controlled and may further incorporate a rate controller to maintain a chosen application rate as speed varies. This application rate may be varied conveniently. The rate controller may be a present rate controller such as measures the speed and total fluid volume delivered and then adjusts the pressure to maintain the application rate, or may be a novel rate controller which measures the speed and fluid pressure and then adjusts the pressure to maintain the application rate. Either rate controller would operate the control valves to select the proper combination of operating nozzles in addition to adjusting the pressure.

10 Claims, 4 Drawing Sheets

EXTENDED RATE RANGE SPRAYER NOZZLE SYSTEM

This invention deals with the field of sprayers such as agricultural sprayers, and in particular such a sprayer with a nozzle mounting and control system which conveniently provides an extended range of application rates.

BACKGROUND

There are many applications where it is necessary to spray a fluid material onto a surface, often the ground. This application is most notable in agriculture, horticulture and such things as golf course maintenance and pest control where chemicals are mixed with water and then sprayed on the ground, bodies of water or on growing crops. Various fluids must also often be sprayed on roadways and other surfaces as well.

Spraying is accomplished with ground sprayers, either self-propelled or towed units, and with aerial sprayers mounted on airplanes or helicopters.

Such sprayers commonly comprise a tank of fluid, a pump for pressurizing and distributing the fluid to spray nozzles and means to control the fluid pressure. Sprayers typically have a plurality of nozzle bodies, each securing a spray nozzle, mounted on booms which swing in for transport and out for operation. Airplane mounted sprayers typically have a boom fixed to the wings.

The nozzle locations are spaced apart on a boom, perpendicular to the direction of travel, at a standard spacing distance which corresponds to the spray pattern of the nozzles. The same size nozzle is in operating position at each nozzle location, providing a consistent application rate across the width of the sprayer. The most common spray pattern is a flat-fan pattern, and the nozzles are generally rotated approximately 10 degrees from being perpendicular to the direction of travel in order that the overlapping spray patterns do not intersect and interfere with each other.

The booms may be of the "wet boom" type, where the boom comprises a frame member with a pipe mounted thereon, the fluid passing through the pipe into nozzles mounted on the pipe and fluidly connected thereto, or a "dry boom" type, where the nozzles are mounted to the frame member and fluid passes to the nozzles through a hose which is connected between the nozzles. The "boom" then is the structure upon which the nozzles are mounted, fluid passing directly through the "wet boom", and fluid passing through a separate hose to nozzles mounted on a "dry boom".

A pump delivers the fluid to the nozzles, the fluid pressure being controlled by a pressure regulating valve.

Such sprayers must accurately dispense the fluid over the desired area of ground. Historically this has been accomplished by providing a spray nozzle having a set operating pressure such that when operated at that pressure, the nozzle accurately dispensed a known amount of fluid per time unit. Operating the sprayer at a known speed then accurately resulted in the correct amount of fluid being dispensed over a given area. For example a sprayer nozzle designated 01 would apply 22 liters per acre of ground covered when operated at a pressure of 40 pounds per square inch (psi) and a speed of 5 mph. A nozzle designated 02 would apply 45 liters per acre at the same pressure and speed.

At pressures above or below the operating pressure of 40 psi, the spray pattern would distort, and the proper amount of fluid would not be accurately distributed across the width of the spray pattern.

One obvious problem was that as speed increased or decreased the application rate increased or decreased accordingly. To help overcome this problem, "extended range" nozzles were developed which maintained an accurate distribution across the width of the spray pattern at a range of pressures from approximately 20 psi to 60 psi. If the operator wanted to spray at an increased speed, he could increase the pressure to maintain the same application rate, and similarly the pressure could be reduced if he wanted to reduce his speed. Rate controllers became available as well which measured the total flow of fluid to the nozzles and automatically varied the pressure as the speed varied, maintaining a constant total flow to the nozzles and therefore a stable application rate. Using, for example an ER01 nozzle, the operator could maintain a 22 liter per acre application rate while traveling from approximately 3.5 mph to 6 mph.

Such extended range nozzles also facilitated variations in the application rate if desired. Using the ER01 nozzles again, at a speed of 5 mph, the operator could vary the application rate from approximately 16 liters per acre to 27 liters per acre.

In order to exceed these application rates, or to exceed these speeds, a nozzle change is required. Various systems are available whereby three or more different nozzles are located on a swivel at each nozzle location. Only one of these nozzles is in the operating position at any given time, and to change to a different nozzle, the operator is required to stop and manually rotate the swivel to put a different nozzle into the operating position Application rates required for ground sprayers range from 12 liters per acre to 250 liters per acre. Speeds range from 4 mph to in excess of 25 mph. Many custom applicators encounter a wide range of application rates every day, requiring frequent nozzle changes daily, and costly delays. As well, operators often have difficulty maintaining the sprayer speed within the required range. Often rough ground is encountered, or corners, requiring much reduced speed.

Aerial sprayers travel much faster, however similar limitations apply as to the variability of application rates. The object is to apply a given amount of material on a given area.

Sprayers are presently available which have two booms. There are two separate pumps and two separate tanks typically containing two different fluids. A different fluid is delivered to each boom and the nozzles mounted thereon. The booms may be operated independently, allowing for different fluids to be applied on different areas as the sprayer passes over them. Essentially there are two separate sprayers carried on the same frame. Alternatively, the same fluid could be contained in each tank, or a single pump and tank could deliver fluid to each boom. With one size nozzle operating on one boom, and a different size nozzle operating on the second boom, a wider range of application rates could be obtained than is possible with one nozzle.

While a dual boom sprayer could provide the same benefits as two sets of nozzles on the same boom, the very high cost of such sprayers has made them economically feasible only where the application of two separate fluids makes an extra trip over the ground unnecessary. The cost of having three booms to provide a system with increased versatility would be prohibitive.

SUMMARY OF THE INVENTION

It is an object of the present invention to provide a system for mounting and controlling the flow to nozzles on a sprayer which will allow a much broader range of application rates and operating speeds than is presently available.

It is a further object of the present invention to provide such broader ranges of application rates and operating speeds without stopping the sprayer to make adjustments.

It is a further object of the present invention to provide such broader ranges of application rates and operating speeds that may be automatically controlled such that the application rate remains constant as the speed of the sprayer varies and such that the desired application rate may be varied.

The invention accomplishes these objects providing a nozzle mounting and control system for use in sprayers comprising a set of first nozzles mounted in the operating position at standard spacings on the sprayer boom and operatively connected to the pressurized fluid supply of said sprayer; a set of second nozzles mounted in the operating position at standard spacings on said sprayer boom and operatively connected to the pressurized fluid supply of said sprayer; wherein said first and second nozzles are oriented such that their spray patterns do not intersect; and a control means operable to shut off the supply of pressurized fluid to at least one of said set of first nozzles or said set of second nozzles.

Control of the flow to one set of nozzles will allow for variation of the rate, however controlling flow to both sets will increase the versatility of the system.

The first and second nozzles can be aligned in the direction of sprayer travel, such that the spray from each first nozzle covers substantially the same area as the spray from a corresponding second nozzle when the sprayer travels.

Alternatively the first and second nozzles can be arranged such that they are spaced apart relative to the direction of sprayer travel and such that one of said first nozzles is between two corresponding second nozzles. It is contemplated that the nozzles would generally be equally spaced along the sprayer boom, providing thereby the best coverage across the boom and also interfering less with one another. Any side by side spacing could be used if the circumstances warranted, or the nozzles could be stepped back from one another in the direction of travel.

A drawback with such lateral spacing is that the application rate will not be constant at the ends of the boom, as is the case when the nozzles are aligned in the direction of travel. This can be remedied, when the sprayer travels around a field, by slightly extending the over-lap on the next pass to compensate. When the sprayer travels back and forth however, it will not be possible to compensate properly. However with the standard 20 inch nozzle spacing, the first and second nozzles would be 10 inches apart and there will be no practical disadvantage since sprayers are commonly 100 feet wide and it is most common to overlap one or more feet on the next pass.

It is contemplated that the desired configuration would have at least three sets of nozzles. The same considerations apply to this configuration as discussed above for the arrangement of two sets of nozzles. It is contemplated that the invention could incorporate four, five or more nozzles while remaining within the scope of the invention.

In any of the embodiments, remote control means could be incorporated allowing the control means to be operated from the sprayer operator's position. Such remote control means could control a valve located at each nozzle location controlling the pressurized fluid supply to each nozzle, or could operate a valve which controlled the pressurized fluid supply to each set of nozzles.

Automatic rate control means could be incorporated to vary the fluid pressure and operate the control valves in response to changes in the speed of the sprayer.

This rate controller could operate as do present rate controllers which measure total flow to the nozzles, and adjust the pressure in response to speed changes in order to maintain the total flow to the nozzles at the proper amount for the given speed. Thus when the speed increases, the total flow to the nozzles must increase and the pressure is increased to achieve this. The system could be incorporated into an existing rate controller with manual remote control switches to turn the nozzle sets off or on. As the existing flow meter reached its upper or lower limits, the operator could change the nozzle combination "on the go" and the rate controller would be able to adjust the flow rate to the speed within the given pressure limits.

Alternatively the total flow might not be measured, and the rate controller could instead measure the pressure and vary the pressure in response to speed changes on the premise that with a given combination of nozzles and a given speed, the pressure shall be "P" to achieve the proper application rate. Varying the speed will change the pressure alone, or, when the limits for a nozzle combination are achieved, will change the combination of operating nozzles and the operating pressure to maintain the desired application rate. With this method, the operator may shut off a portion of the boom and still have the proper rate delivered by the rate controller. In most present rate controllers this is not possible because when a portion of the boom is shut off, the total flow to the nozzles is reduced, and the rate controller attempts to increase the pressure to achieve the proper total flow. Some recent improved rate controllers have the ability to read which boom portions are on and adjust the flow required accordingly, thereby allowing for accurate rate control when a boom portion is turned off, however the option of sensing and varying pressure is simple and economical and would be useful in many applications.

This ability will allow the operator to effectively deal with the final pass on a field, which is often narrow and requires the operation of only a portion of the boom.

In another embodiment the present invention provides a nozzle mounting and control system for use in sprayers comprising: a nozzle holding member mounted on a sprayer boom; a first nozzle secured by said nozzle holding member in its operating position; a second nozzle secured by said nozzle holding member in its operating position; wherein said first and second nozzles are oriented such that their spray patterns do not intersect; a pressurized source of fluid operatively connected to said nozzle holding member for supplying said first and second nozzles with pressurized fluid; and a control means operable to shut off the supply of pressurized fluid to at least one of said first or second nozzles independently such that when the pressurized fluid supply to one nozzle is shut off, the other nozzle is still operatively connected to said pressurized fluid supply.

Thus a single nozzle holding member could accommodate two nozzles with individual control valves for each nozzle. Such nozzle holding members could be adapted for three or more nozzles if desired.

The invention provides a novel system for mounting multiple nozzles on a single boom such that all nozzles are in the operating position all the time, instead of as in the present systems described above where only one nozzle is in the operating position and when a different nozzle is needed it must be swivelled into position by which action the first nozzle is swivelled out of position.

In the present invention, typically two or more sets of nozzles are mounted in the operating position. Where the nozzles are mounted in-line, one of each nozzle is in place at each nozzle location on the sprayer, spaced at the standard spacing distance, and with the combination of different nozzle sizes the same at each location. Each nozzle is in fluid communication with the fluid supply. The invention may be practiced with either a wet or dry boom. One of the nozzle sets may be uncontrolled, such that when the fluid supply is pressurized that nozzle will spray. The remainder of the nozzle sets are individually controllable such that the fluid supply to each of them may be turned off.

In order to provide the widest range of application for a given number of nozzle sets all nozzle sets should be individually controllable. Such control may be manual, in the simplest applications, requiring the operator to stop the sprayer and manually turn the chosen nozzles on or off This mode of operation would essentially replace the present swivel systems used to change nozzles, with the advantage that more than one nozzle could be operating at the same time.

Remote operation is possible using electric solenoid valves, air pressure operated valves or any like mechanism. In this remote control system, all nozzles of the same size along the boom would be controlled by a single control. For example, there could be three nozzle sets. The first nozzle set is an ER01, the second is an ER15 and the third is an ER05. The control is set up such that all first nozzles, the ER01's, are either on or off, all second nozzles, the ER15's are either on or off, and all third nozzles, the ER05's , are either on or off. The operator could thus vary the rate from his seat by opening or closing the desired nozzles.

For example with first nozzles designated ER01, second nozzles designated ER15 and third nozzles designated ER05 the application rates at 5 mph would be as follows:

| Noz. #1 (ER01) | Noz. #2 (ER15) | Noz. #3 (ER05) | Application Rate Range (20–60 psi) |
|---|---|---|---|
| on | off | off | 16–27 litres/acre |
| off | on | off | 25–40 litres/acre |
| on | on | off | 40–66 litres/acre |
| off | off | on | 66–114 litres/acre |
| on | on | on | 107–180 litres/acre |

As the table shows, this particular combination of nozzles provides a complete range of application rates from 16–180 liters/acre at 5 mph, all achievable from the operators seat, without stopping the sprayer. The addition of a fourth nozzle position would greatly extend the range.

The practical benefit of the system is seen by looking at the converse situation where the application rate is kept constant and the speed varies, as is commonly encountered in field operations. With the above combination of nozzles a common application rate such as 32 liters/acre may be maintained with sprayer operating speeds from 2.5 mph to 28 mph.

Thus the invention allows for adjustment of both the application rate and the speed of the sprayer.

It is contemplated that each individual nozzle could be individually controlled, if an application so warranted the added control expenses. In this configuration the controls would operate so that each individual nozzle in a set could be on or off and the set itself could be on or off. This would, for instance, allow the operator to turn off the nozzles at one or more nozzle location on the ends of the booms to spray precisely the area that required spray application without spraying an area which did not require spray application, as is commonly encountered when doing the last pass in a field.

Even without the automatic rate controller, and using manual nozzle controls, this system allows for a broader range of application rates using the nozzles in combination than is presently available where only one nozzle at a time is operable. Five nozzles would be required in any prior art system, where only one nozzle operates at any time, to provide the complete range shown in the table above and provided by three nozzles. This is the result of the systems ability to operate the nozzles in combination.

The above is merely an example of a possible nozzle combination. Simple calculations will lead to the correct combination for a given speed range and application rate.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a cut-away side view of the nozzles of an embodiment, comprising one nozzle body attached to a wet sprayer boom, with the nozzles in-line;

FIG. 2 is a bottom view of the nozzles of the embodiment of FIG. 1;

FIG. 3 is a is a front view of the nozzles of an embodiment comprising three sets of nozzles equally spaced along a wet sprayer boom;

FIG. 4 is a bottom view of the nozzles of the embodiment of FIG. 3;

FIG. 5 is a bottom schematic view of the nozzles of the embodiment of FIG. 1 showing the sprayer boom and the air lines controlling the valves;

FIG. 6 is a bottom schematic view of the nozzles of the embodiment of FIG. 1 showing the sprayer boom and the separate supply lines to each set of nozzles;

FIG. 7 is a bottom schematic view of the nozzles of the embodiment of FIG. 1 showing the sprayer boom and electric wires controlling the valves;

FIG. 8 is a schematic view of the control boxes of FIG. 7.

DETAILED DESCRIPTION OF THE ILLUSTRATED EMBODIMENTS

Although the present invention contemplates two or more nozzles, it is contemplated that the most common and useful embodiment will comprise at least three nozzles, allowing for a satisfactory application range for most applications. FIGS. 1–2 show one preferred embodiment of the invention. Multiple nozzle body 10 is secured by nozzle body clamp 11 to a wet boom 12 carrying pressurized fluid which enters the multiple nozzle body 10 through aperture 13. Multiple nozzle body 10 is molded to secure three nozzles 8-A, 8-B and 8-C oriented in-line in the direction of travel A and to provide fluid communication to same. Multiple nozzle body 10 also accommodates a valve 7 in each nozzle supply line, the valves being operable to turn the supply of pressurized fluid to each nozzle 8 off or on, independently from each other nozzle.

In the illustrated embodiment, each nozzle 8 is individually controllable and it is contemplated that this will be the most useful arrangement. It is however also contemplated that there may be applications where it is desired to have one of the nozzles operating at all times, with only the further nozzles controllable, and such an application is considered within the scope of the present invention.

Figure 2:
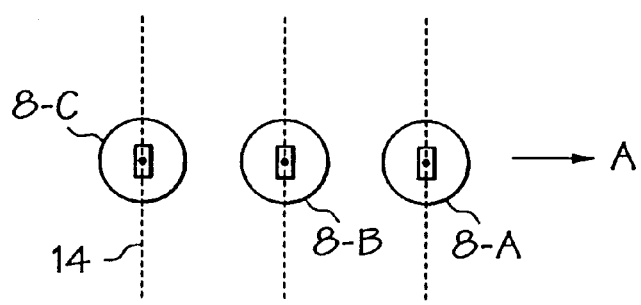

FIG. 2 shows a bottom view of the nozzles of FIG. 1, showing the flat fan spray pattern 14. FIG. 2 also demonstrates the 10 degree rotation of the nozzles which is common in the industry to avoid interference of adjacent spray patterns.

Figure 3:
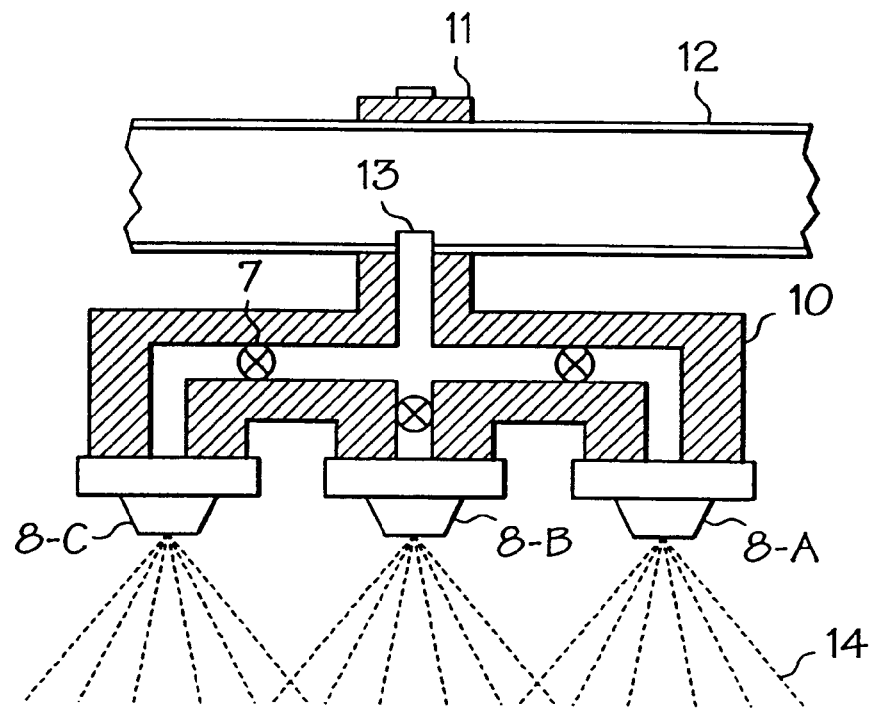
Figure 4:
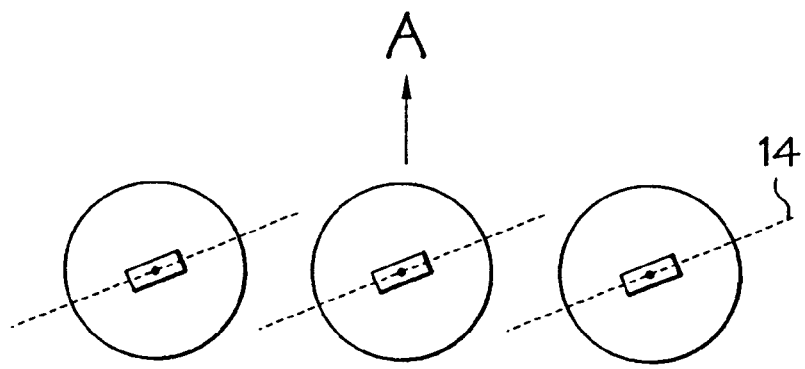

FIGS. 3–4 show an embodiment with three different sets of nozzles wherein the nozzles are spaced equally along the sprayer boom in the order 8-A, 8-B and 8-C. In this embodiment the distance between one 8-A nozzle and the next 8-A is 20 inches, between one 8-B and the next 8-B is 20 inches and similarly between one 8-C and the next 8-C is 20 inches. Thus the nozzles in each set are properly spaced one from the other. The resulting spacing between nozzles 8-A and 8-B or between 8-B and 8-C on the boom is 6⅔ inches. It is contemplated that the nozzles could be spaced unequally as well, and that such spacing would fall within the scope of the invention.

The spray patterns 14-A and 14-B are illustrated in FIG. 3 and a bottom view of all the spray patterns 14 is shown in FIG. 4. An overlap of 13⅓ inches will compensate for the fact that all nozzles do not reach the end of the boom. This over-lap should present no practical detriment in operation of the typical wide sprayer. It can be seen that with either a wet or dry boom, nozzles may be accommodated in side by side or in-line configurations.

The three different nozzles, 8-A, 8-B and 8-C may be any nozzle size that is required to provide the desired range of application rate. All 8-A nozzles would either be on or off at the same time, as would all 8-B or all 8-C nozzles.

Figure 5:
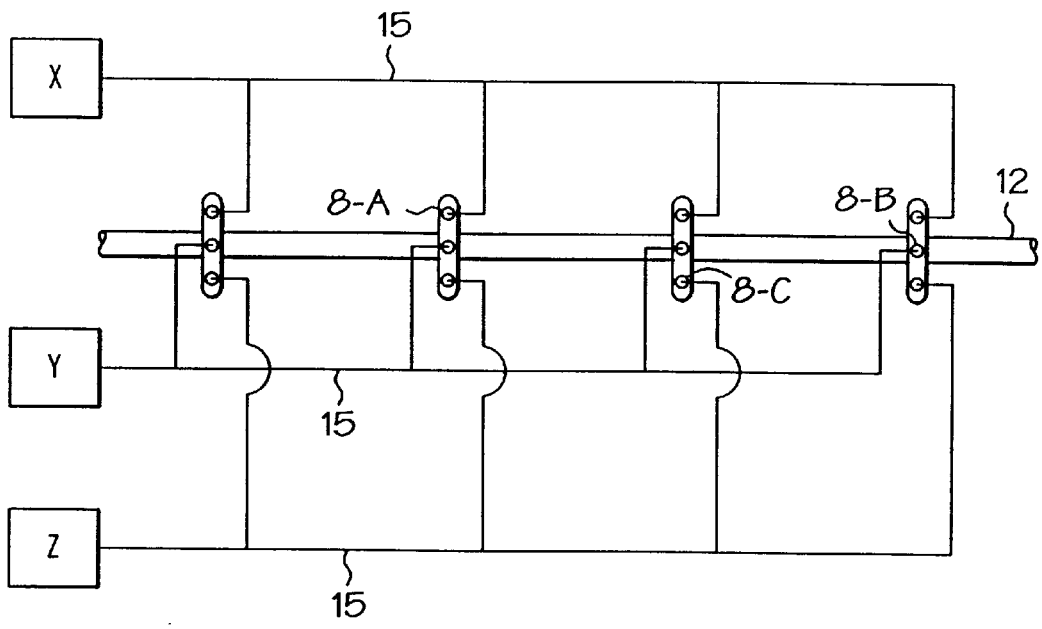

FIG. 5 shows the triple nozzle arrangement of the embodiment of FIG. 1 with control lines 15 connecting the valves 7 on the supply to each nozzle 8. Control box X is connected to each valve 7 to nozzles 8-A in the leading position. Similarly control box Y is connected to each valve 7 to nozzles 8-B in the middle position and control box Z is connected to each valve 7 to nozzles 8-C in the trailing position. In this manner, all leading nozzles are either on or off, all middle nozzles are either on or off and all trailing nozzles are either on or off. Application rates are controlled by controlling nozzles in each position, thus maintaining a consistent application rate across the width of the sprayer.

Valves 7 may be remotely operated by air, electricity or other similar means carried by control lines 15.

Figure 6:
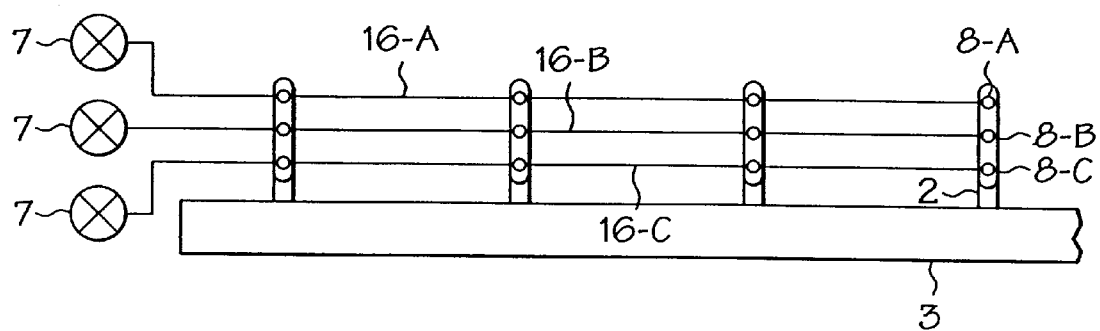

FIG. 6 also shows the triple nozzle arrangement of the embodiment of FIG. 1, however rather than a valve 7 at each nozzle, each set of nozzles is supplied by separate supply lines 16-A, 16-B and 16-C, and valves 7 control the pressurized fluid supply to each supply line 16 and thus each set of nozzles. The valves 7 may be controlled manually or be activated by electricity, air pressure or any conventional means.

Present rate controllers control the application rate by reading a speed input signal along with the total rate of flow to the sprayer nozzles and adjusting the pressure of the fluid to keep the rate of flow to the nozzles at a constant volume per unit of area covered.

Similar technology could be used in the present system to attain a much broader range of application rates by programming the controller to additionally turn on or off a predetermined combination of nozzles in response to changes in the speed, or in fact by changing the combination using manually operated remote control switches. As the fluid pressure reached the minimum or maximum, a different combination of nozzles would be turned on by operating the valves 7 and the rate controller would adjust the pressure for the new combination in order to provide the constant volume per unit of area covered.

The system lends itself as well to a rate controller that does not read the flow rate to the nozzles at all, but rather is programmed to measure speed and pressure, and to provide a given combination of nozzles and pressure at any given speed, thereby providing a constant volume per unit of area so long as the nozzles are operating according to specifications. Such a system would have an advantage in that one or more boom sections could be turned off and the rate controller would still operate to provide the proper combination of nozzles and pressure to the remaining operating nozzles, since it is not dependent on the total flow rate, but only on the speed.

To illustrate this process using the earlier example with first nozzles designated ER01, second nozzles designated ER15 and third nozzles designated ER05, the speed range at an application rate of 32 liters/acre would be as follows:

| Noz. #1 (ER01) | Noz. #2 (ER15) | Noz. #3 (ER05) | Speed Rate Range |
|---|---|---|---|
| on | off | off | 2.5–4.2 mph |
| off | on | off | 3.9–6.3 mph |
| on | on | off | 6.3–10.3 mph |
| off | off | on | 10.3–17.8 mph |
| on | on | on | 16.7–28.1 mph |

As sprayer speed increases from 2.5 mph to 4.0 mph, the rate controller increases the pressure from 20 psi to approaching 60 psi. At approximately 4.0 mph, the rate controller turns off the set of #1 nozzles and turns on the set of #2 nozzles, and reduces the pressure to 20 psi. As speed increases the pressure is increased to 60 psi at 6.3 mph, at which time the rate controller turns on the set of #1 nozzles again so that nozzles #1 and #2 are both operating and reduces pressure to 20 psi. As speed increases again the pressure is increased to 60 psi at 10.3 mph, at which time the rate controller turns off the #1 and #2 nozzles and turns on the set of #3 nozzles and reduces pressure to 20 psi. As speed increases again, the pressure is increased to approaching 60 psi at 17 mph, at which time the rate controller turns on the #1 and #2 nozzles, so that all nozzles are operating, and reduces pressure down to approximately 20 psi. As speed increases to the maximum of 28.1 mph, the pressure is increased to 60 psi.

The rate controller then measures sprayer speed and pressure and then adjusts a pressure regulator and/or turns switches on and off in response to speed changes. The total fluid flow to the nozzles is not measured, thus allowing the rate controller to operate when only a portion of the sprayer boom width is operating.

The operator could also at any time vary the chosen application rate, and have the rate controller maintain the new application rate as the sprayer speed varies.

Figure 7:
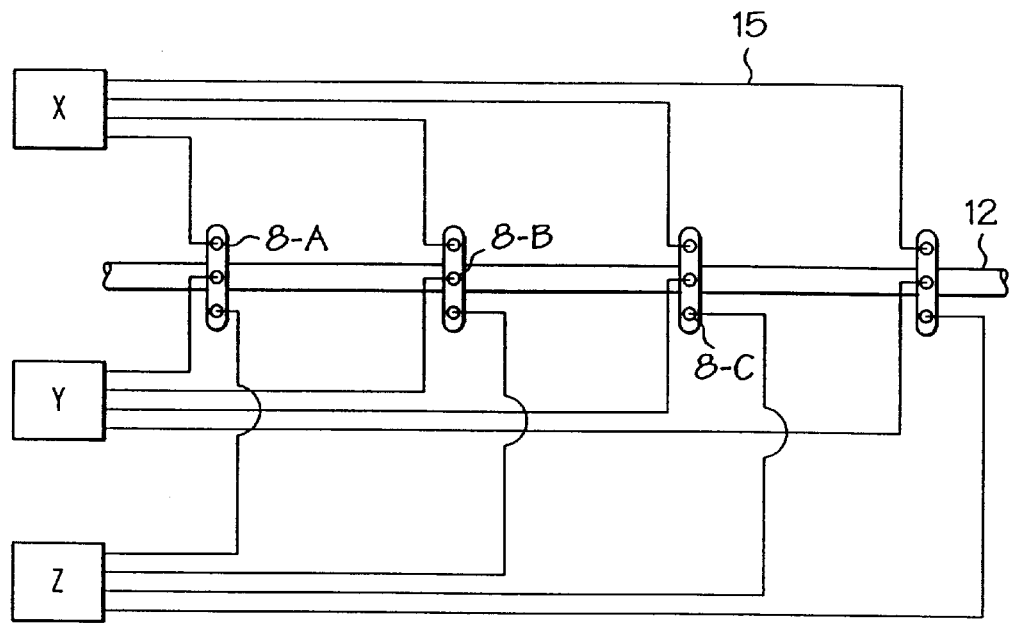
Figure 8:
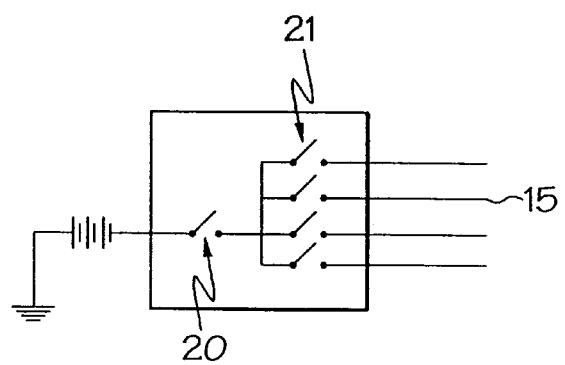

FIG. 7 shows an embodiment wherein each individual nozzle may be turned on or off, as well as the set of A, B or C nozzles. FIG. 8 shows a schematic of an electrical switch control that would accomplish this control. When primary switch 20 is on, the nozzles in the set are individually controlled by secondary switches 21. When primary switch 20 was off, no nozzles in the set would operate. A rate controller could thus operate the primary switch 20 in the usual manner as described above, while the operator controlled which nozzles in the set were operating at any given time, in order to control the area where spray was being applied. A similar arrangement of air valves would appropriately control air operated valves.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A nozzle mounting and control system for use in sprayers, said sprayers adapted to be moved across the ground in a direction of travel and including a sprayer boom and a pressurized fluid supply, said system comprising:

a nozzle holding member mounted on said sprayer boom and operatively connected to said pressurized fluid supply for supplying pressurized fluid to nozzles secured in said nozzle holding member;

a first nozzle to dispense a first spray pattern secured by said nozzle holding member in an operating position;

a second nozzle to dispense a second spray pattern secured by said nozzle holding member in an operating position;

wherein said first and second nozzles are oriented such that said first and second spray patterns do not intersect;

wherein said first and second nozzles are aligned in the direction of sprayer travel, such that said first spray pattern covers substantially the same ground as said second spray pattern when the sprayer moves; and a control operable to shut off said pressurized fluid supply to at least one of said first or second nozzles independently.

2. The system of claim 1 further comprising:

a third nozzle to dispense a third spray pattern secured by said nozzle holding member in an operating position;

wherein said third nozzle is oriented such that said third spray pattern does not intersect said first or second spray patterns; and a control operable to shut off said pressurized fluid supply to at least two of said first nozzle, said second nozzle, or said third nozzle independently.

3. The system of claim 2 wherein said first, second and third nozzles are aligned in the direction of sprayer travel, such that said first, second and third spray patterns cover substantially the same ground when the sprayer moves.

4. The system of claim 1 further comprising means to operate said control from a sprayer operator's position.

5. The system of claim 4 wherein said means to operate said control from a sprayer operation's position comprises means to operate a plurality of valves controlling the pressurized fluid supply to each controlled nozzle.

6. The system of claim 4 wherein said means to operate said control from a sprayer operator's position comprises means to operate a valve controlling the pressurized fluid supply to each set of similar of nozzles.

7. The system of claim 4 further comprising an application rate controller which senses the pressure of said pressurized fluid supply and speed of said sprayer along the ground and automatically adjusts said pressure and operates said control in response to changes in the speed of said sprayer, thereby maintaining a constant application rate as the speed varies.

8. The system of claim 7 further comprising means to adjust said application rate.

9. The system of claim 4 further comprising an application rate controller which senses the volume of fluid flowing to said nozzles and speed of said sprayer along the ground and automatically adjusts the pressure of said pressurized fluid supply and operates said control in response to changes in the speed of said sprayer, thereby maintaining a constant application rate as the speed varies.

10. The system of claim 9 further comprising means to adjust said application rate.

* * * * *